UNITED STATES PATENT OFFICE.

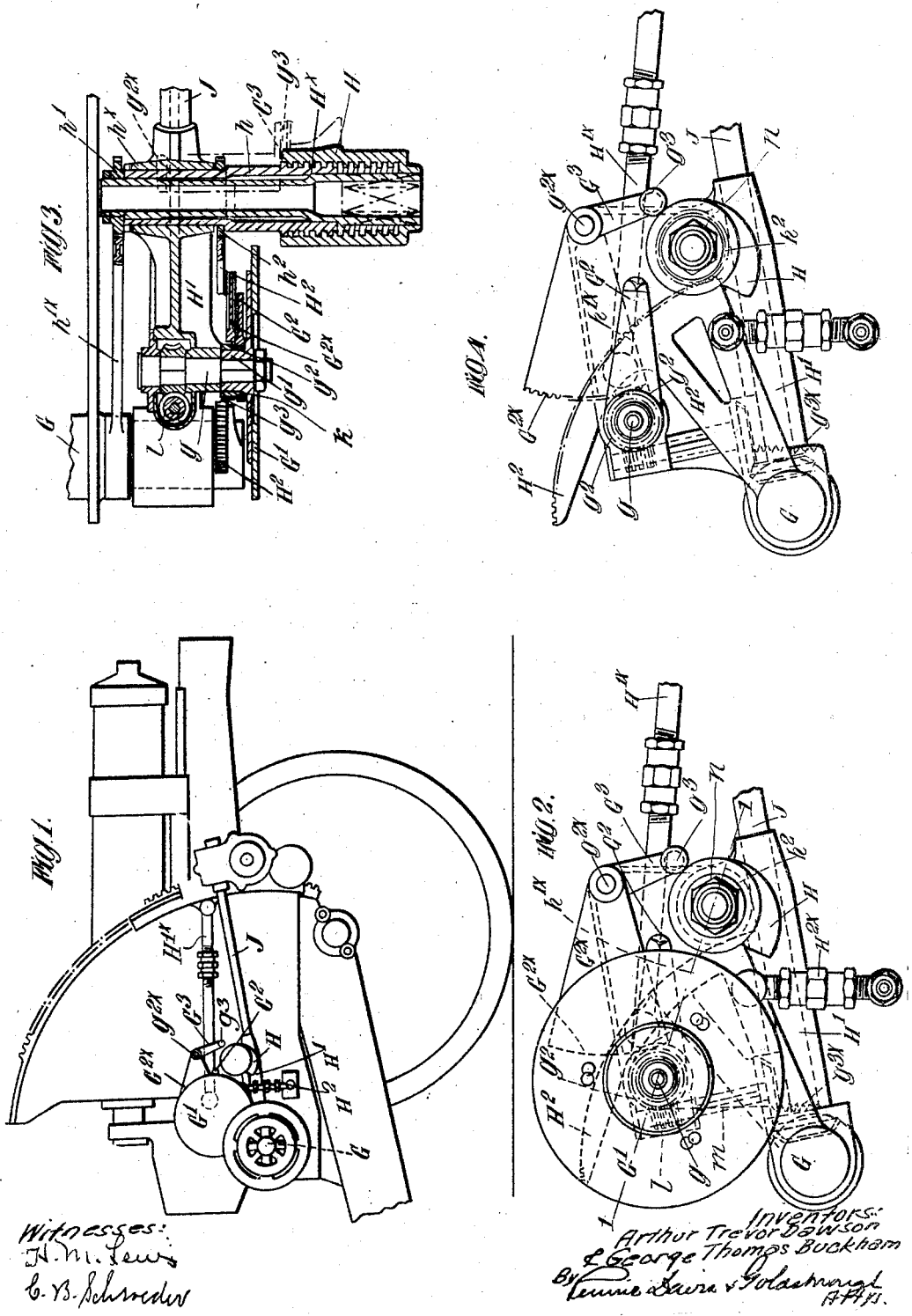

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

RANGE-INDICATING MECHANISM.

1,161,292.  Specification of Letters Patent.  Patented Nov. 23, 1915.

Application filed May 13, 1913. Serial No. 767,267.

*To all whom it may concern:*

Be it known that we, ARTHUR TREVOR DAWSON, knight, and GEORGE THOMAS BUCKHAM, both subjects of the King of Great Britain, residing at Vickers House, Broadway, Westminster, in the county of London, England, have invented certain new and useful Improvements in or Relating to Range-Indicating Mechanism, of which the following is a specification.

This invention relates to range indicating mechanism of the kind for use with ordnance firing at high angles of elevation in which a cam is employed for controlling the movements of the pointer of the range dial or drum, the surface of this cam being composed of a number of curves based on the firing angles for various altitudes of the object aimed at.

According to this invention we so construct and arrange the range indicating mechanism that the aforesaid cam for controlling the pointer of the range dial or drum is disposed some distance from the trunnions instead of in alinement therewith as in the devices heretofore proposed by us. For this purpose the range dial or drum may be situated on the right hand side of the gun and may be operated from the main shaft of the ranging gear by suitable gearing, the whole of this gearing together with the cam being carried on a bracket or casing which is preferably pivoted in a position co-axial with the trunnions.

In order that the said invention may be clearly understood and readily carried into effect we will describe the same more fully with reference to the accompanying drawings, in which:—

Figure 1 is a side elevation of a gun mounting showing a form of range indicating mechanism constructed in accordance with our invention. Fig. 2 is a side elevation. Fig. 3 is a section on line 1—1 of Fig. 2 showing the range indicating mechanism on an enlarged scale. Fig. 4 is a view similar to Fig. 2 with the range dial removed.

In these figures, G represents an extension of one of the gun trunnions, G' the range dial or drum and $G^2$ its pointer.

H represents the cam for controlling the movements of the pointer and H' the bracket or casing pivoted co-axially with the trunnion. J represents the ranging shaft carried by the said bracket.

In the example shown the movable pointer $G^2$ is rigidly mounted on the boss $k$ of a pinion $g^2$ loosely mounted on a boss $g'$ of the range dial G', the latter in turn being attached to a spindle $g$ carried in the bracket H' and adapted to be driven by the bevel and worm gearing $l$ shown in Figs. 2 and 3 from the ranging shaft J. The said pinion $g^2$ gears with a quadrant $G^{2x}$ pivotally mounted at $g^{2x}$ (Fig. 2) to the bracket H'. The said quadrant $G^{2x}$ is formed with a lever $G^3$ carrying a roller $g^3$ which is kept in contact with the aforesaid cam H by means of a suitable tension spring $g^{3x}$ attached to a wire $m$ which coils upon the boss of the pinion $g^2$. The said cam H which is preferably arranged as shown to the front of the gun trunnions, is in the example illustrated formed with internal screw threads which engage with threads formed on a hollow screw $H^x$ supported in a bearing $h^x$ on the bracket H'. The said hollow screw is provided with a bush $h$ having a hexagonal outer end $u$ upon which the cam H can slide but cannot turn. The said screw has secured to it a spur wheel $h^2$ which engages with a quadrant $H^2$ adjustably secured to the gun carriage, by means of the screw and nut arrangement $H^{2x}$ (Fig. 2.) The said bush $h$ has secured to its inner end a spur wheel $h'$ which engages with a quadrant $h'^x$ pivoted on the extension G of the gun trunnions by means of the rod $H'^x$ pivoted to the quadrant and connected to a part that moves during pointing only.

When the gun moves during pointing, the whole gear is displaced with the exception of the quadrant $H^2$ appertaining to the hollow screw $H^x$ (the said quadrant being as aforesaid connected to the gun carriage) and the said screw owing to the engagement of its pinion $h^2$ with the quadrant $H^2$ thus receives a relative rotary displacement which effects an axial movement of the cam H, the latter being prevented from rotating by the bush $h$ as aforesaid. When the gun is further elevated for range, the same condition exists, except that the quadrant $h'^x$ appertaining to the aforesaid bush $h$ also remains stationary owing to its connection by the rod $H'^x$ with the aforesaid part that moves during pointing only, with the result that the pinion $h'$ gearing with the said quadrant $h'^x$ is angularly displaced together with the bush $h$, the screw $H^x$, and the cam $H$; hence the cam is displaced axially during pointing and angularly during ranging. The contour of the cam is so designed as to give the necessary correction to the pointer $G^2$ during these movements. The range dial may be so constructed that it can be easily removed and replaced when desired.

What we claim and desire to secure by Letters Patent of the United States is:—

1. In range indicating mechanism for ordnance, the combination with two members constituting a range indicator, of a bracket pivoted coaxially with the gun trunnions and carrying said members, a cam mounted on said bracket for controlling the movements of one member of said indicator, and a pivot for said cam arranged on said bracket some distance from the gun trunnion.

2. In range indicating mechanism for ordnance, the combination with a range dial and its pointer constituting a range indicator, of a bracket pivotally coaxially with the gun trunnions and carrying the range indicator, a cam mounted on said bracket for controlling the movements of said pointer, a pivot for said cam arranged on said bracket some distance from the gun trunnion, means for axially moving the said cam during the pointing of the gun, and means for angularly moving said cam during the ranging of the gun.

3. In range indicating mechanism for ordnance, the combination with a range dial and its pointer constituting a range indicator, of a bracket pivoted coaxially with the gun trunnions and carrying the range indicator, a cam mounted on said bracket for controlling the movements of said pointer, a pivot for said cam arranged on said bracket some distance from the gun trunnion, a toothed member geared with said pointer, a part of said member bearing on the cam, a hollow screw engaging with internal screw threads on said cam, a bush for said hollow screw, a spur wheel secured to said screw, a toothed member secured to the gun carriage and gearing with said spur wheel on said bush, and a toothed member moving only during the pointing of the gun and gearing with the last mentioned spur wheel.

4. In range indicating mechanism for ordnance, the combination with a range dial and its pointer constituting a range indicator, of a bracket pivoted coaxially with the gun trunnions and carrying the range indicator, a cam mounted on said bracket for controlling the movements of said pointer, a pivot for said cam arranged on said bracket some distance from the gun trunnion, a quadrant geared with said pointer, a part of said quadrant bearing on the cam, a hollow screw engaging with internal screw threads on said cam, a bush for said hollow screw, a spur wheel secured to said screw, a quadrant secured to the gun carriage and gearing with said spur wheel, a spur wheel on said bush, and a quadrant moving only during the pointing of the gun and gearing with the last mentioned spur wheel.

In testimony whereof we affix our signatures in presence of two witnesses.

ARTHUR TREVOR DAWSON.
GEORGE THOMAS BUCKHAM

Witnesses:
HENRY KING,
JNO. R. CASWELL.